(12) United States Patent
Licht et al.

(10) Patent No.: US 7,786,207 B2
(45) Date of Patent: Aug. 31, 2010

(54) METHOD FOR PRODUCING MINIEMULSION BLOCK POLYMERS

(75) Inventors: Ulrike Licht, Mannheim (DE); Markus Antonietti, Bergholz-Rehbruecke (DE); Katharina Landfester, Ulm (DE)

(73) Assignees: BASF Aktiengesellschaft, Ludwigshafen (DE); Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 1127 days.

(21) Appl. No.: 10/581,124

(22) PCT Filed: Dec. 4, 2004

(86) PCT No.: PCT/EP2004/013812

§ 371 (c)(1), (2), (4) Date: May 31, 2006

(87) PCT Pub. No.: WO2005/054323

PCT Pub. Date: Jun. 16, 2005

(65) Prior Publication Data

US 2008/0287606 A1 Nov. 20, 2008

(30) Foreign Application Priority Data

Dec. 8, 2003 (DE) ................. 103 57 533

(51) Int. Cl.
| | |
|---|---|
| *C08F 2/16* | (2006.01) |
| *C08F 8/00* | (2006.01) |
| *C08F 8/30* | (2006.01) |
| *C08F 283/00* | (2006.01) |
| *C08F 283/04* | (2006.01) |
| *C08G 18/08* | (2006.01) |
| *C08G 18/42* | (2006.01) |
| *C08J 3/02* | (2006.01) |
| *C08K 3/20* | (2006.01) |
| *C08L 9/00* | (2006.01) |
| *C08L 11/02* | (2006.01) |
| *C08L 13/02* | (2006.01) |
| *C08L 19/02* | (2006.01) |
| *C08L 21/02* | (2006.01) |
| *C08L 51/00* | (2006.01) |
| *C08L 53/00* | (2006.01) |
| *C08L 67/00* | (2006.01) |
| *C08L 67/02* | (2006.01) |
| *C08L 75/00* | (2006.01) |
| *C09J 7/02* | (2006.01) |

(52) U.S. Cl. .............. 524/505; 524/457; 524/458; 524/507; 524/539; 525/55; 525/123; 525/165; 525/455

(58) Field of Classification Search ........... 524/505, 524/507, 457, 458, 539; 525/123, 455, 55, 525/165
See application file for complete search history.

(56) References Cited

U.S. PATENT DOCUMENTS 5,612,406 A * 3/1997 Frings et al. ............ 524/533
5,990,221 A * 11/1999 Dames et al. ........... 524/457

FOREIGN PATENT DOCUMENTS

| DE | 41 23 223 | 1/1993 |
| DE | 198 52 784 | 5/2000 |
| DE | 100 18 601 | 10/2001 |
| DE | 102 41 294 | 3/2004 |
| EP | 0 522 675 | 1/1993 |
| WO | 02/064657 | 8/2002 |
| WO | 03/083004 | 10/2003 |

* cited by examiner

*Primary Examiner*—Patrick D Niland
(74) *Attorney, Agent, or Firm*—Oblon, Spivak, McClelland, Maier & Neustadt, L.L.P.

(57) ABSTRACT

An aqueous dispersion of a block copolymer comprising a polyadduct or polycondensate (polymer I for short) on one hand and a polymer obtainable by free-radical addition polymerization (polymer II for short) on the other, wherein
  polymer I is obtainable by reaction of its starting compounds in miniemulsion, one of the starting compounds of polymer I is an initiator of free-radical addition polymerization, and
  polymer II is prepared in the presence of said initiator.

16 Claims, No Drawings

METHOD FOR PRODUCING MINIEMULSION BLOCK POLYMERS

The invention relates to an aqueous dispersion of a block copolymer comprising a polyadduct or polycondensate (polymer I for short) on one hand and a polymer obtainable by free-radical addition polymerization (polymer II for short) on the other, wherein
  polymer I is obtainable by reaction of its starting compounds in miniemulsion,
  one of the starting compounds of polymer I is an initiator of free-radical addition polymerization, and
  polymer II is prepared in the presence of said initiator.

The invention further relates to a process for preparing the block copolymers and to the use of the block copolymers.

Polyurethanes are normally prepared by reaction of their starting compounds (isocyanates and isocyanate-reactive compounds) in an organic solvent. Dispersing the resulting polyurethane in water gives what is called a secondary dispersion.

Polyurethane dispersions can also be obtained directly by reaction of the starting compounds in aqueous phase (primary dispersions).

This is possible by the process of polymerization in miniemulsion described in WO 02/064657.

In that process the starting compounds are emulsified in water in the presence of small amounts of a hydrophobic compound having a water solubility of less than $10^{-7}$ g/l water (at 21° C.).

The size of the droplets is adjusted by known methods to 50 to 500 nm. As a result of the presence of the hydrophobic substance the effect of Ostwald ripening (growth of the droplets until phase separation occurs) does not arise.

Instead, in the droplets, the starting compounds can be reacted to polyurethanes, with the droplet size remaining more or less the same. In this way polyurethane primary dispersions are obtained.

Correspondingly it is also possible to prepare copolymers comprising polyurethane and a polymer obtainable by free-radical addition polymerization and to do so in miniemulsion. According to DE-A-10241294 (PF 53898) customary initiators of free-radical addition polymerization are added for that purpose to the mixture of the starting compounds of the polyurethane and of the free-radically polymerizable monomers.

The desire is for defined block copolymers of high molecular weight, so as to achieve effective film forming and good performance properties. The desire is in particular for high transparency in the resultant films and a level of mechanical properties, e.g., of tensile strength and elasticity of the films, which is as close as possible to the properties of the polyurethane alone.

The use of azo initiators attached to polyurethane for preparing block copolymers is described for example in EP-A-522675 or DE-A-4123223.

An object of the present invention, in contrast, was an aqueous dispersion of copolymers having the aforementioned properties. Another object was a simple process for preparing them.

Accordingly the aqueous dispersion defined at the outset has been found.

The dispersions of the present specification are primary dispersions obtainable by reacting the block copolymer's starting compounds in aqueous phase in miniemulsion, as described in DE-A-10241294.

The starting compounds are for that purpose emulsified in water by means of surface-active compounds, e.g., emulsifiers or protective colloids.

The accompanying use of hydrophobic compounds as costabilizers is essential.

These costabilizers have a water solubility of preferably less than $10^{-5}$, more preferably less than $10^{-6}$, very preferably less than $10^{-7}$ g/liter water at 21° C., 1 bar.

The amount of the costabilizers can be, for example, from 0.1 to 10 parts by weight, in particular from 1 to 3 parts by weight per 100 parts by weight of starting compounds.

Examples of suitable costabilizers include hydrocarbons such as hexadecane, halogenated hydrocarbons, silanes, siloxanes, hydrophobic oils (olive oil) or else starting compounds for the polyurethane, provided they have the necessary hydrophobicity.

The particle size of the emulsified droplets of the starting compounds is preferably from 50 to 500 nm.

The particle size can be adjusted by known methods such as homogenization in high-pressure homogenizers or application of ultrasound.

Like the emulsion of the starting compounds, the dispersion obtained has a droplet size of preferably from 50 to 500 nm, more preferably from 100 to 300 nm.

The block copolymer in dispersion in the aqueous phase is composed of a polyadduct or polycondensate, polymer I for short, and a polymer obtainable by free-radical addition polymerization (polymer II for short).

The polyadduct or polycondensate may for example be a polyester, polyurethane, polyurea, polyamide, polyamide acid or epoxy resin.

Preferably it is a polyurethane.

The polyurethane has been preferably synthesized from:
a) polyisocyanates,
b) polyols of which
  $b_1$) 10 to 100 mol %, based on the total amount of the polyols (b), have a molecular weight of from 500 to 5000 g/mol,
  $b_2$) 0 to 90 mol %, based on the total amount of the polyols (b), have a molecular weight of from 60 to 500 g/mol,
c) monomers other than the monomers (a) and (b), having at least one isocyanate group or at least one group which is reactive toward isocyanate groups, and further carrying at least one hydrophilic group or one potentially hydrophilic group,
d) if appropriate further compounds, other than the monomers (a) to (c), having at least 2 isocyanate-reactive groups, of which at least one group is a primary or secondary amino group or a mercapto group,
e) if appropriate, monovalent compounds, other than the monomers (a) to (d), having a reactive group which is an alcoholic hydroxyl group, a primary or secondary amino group or an isocyanate group.

Mention should be made in particular as monomers (a) of diisocyanates $X(NCO)_2$, where X is an aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)-propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI)

such as the trans/trans, the cis/cis, and the cis/trans isomer, and mixtures of these compounds.

Diisocyanates of this kind are available commercially.

Of particular significance as mixtures of these isocyanates are the mixtures of the respective structural isomers of diisocyanatotoluene and diisocyanatodiphenylmethane; in particular the mixture of 80 mol % 2,4-diisocyanatotoluene and 20 mol % 2,6-diisocyanatotoluene is suitable. Also advantageous in particular are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, the preferred mixing ratio of the aliphatic to aromatic isocyanates being from 4:1 to 1:4.

Additionally polyisocyanates having more than 2 isocyanate groups can be used. Suitable examples include isocyanates and biurets of, for example, hexamethylene diisocyanate.

For the synthesis of the polyurethanes it is possible to use as compounds, in addition to those mentioned above, isocyanates which besides the free isocyanate groups carry further, blocked isocyanate groups, e.g., uretdione groups.

From the standpoint of effective film formation and elasticity, suitable polyols (b) include principally polyols (b1) of relatively high molecular weight, having a molecular weight of from about 500 to 5000, preferably from about 1000 to 3000 g/mol. This is the number-average molar weight Mn. Mn is obtained by determining the number of end groups (OH number).

The polyols (b1) can be polyester polyols, which are known, for example, from Ullmanns Encyklopädie der technischen Chemie, 4th edition, Volume 19, pp. 62 to 65. Preference is given to using polyester polyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyester polyols. The polycarboxylic acids can be aliphatic, cycloaliphatic, araliphatic, aromatic or heterocyclic and can if appropriate be substituted, by halogen atoms for example, and/or unsaturated. Examples thereof which may be mentioned include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preference is given to dicarboxylic acids of the general formula $HOOC-(CH_2)_y-COOH$, where y is a number from 1 to 20, preferably an even number from 2 to 20, e.g., succinic acid, adipic acid, sebacic acid, and dodecanedicarboxylic acid.

Suitable polyhydric alcohols include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO-(CH_2)_x-OH$, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is given additionally to neopentyl glycol.

Also suitable if appropriate are polycarbonate diols, such as are obtained, for example, by reacting phosgene with an excess of the low molecular mass alcohols specified as synthesis components for the polyester polyols.

If appropriate it is also possible to use lactone-based polyester polyols, which are homopolymers or copolymers of lactones, preferably adducts of lactones with suitable difunctional starter molecules, said adducts containing terminal hydroxyl groups. Suitable lactones include preferably those derived from compounds of the general formula $HO-(CH_2)_z-COOH$, where z is a number from 1 to 20 and where one hydrogen atom in a methylene unit may also be substituted by a $C_1$ to $C_4$ alkyl radical. Examples are ε-caprolactone, β-propiolactone, γ-butyrolactone and/or methyl-ε-caprolactone and also mixtures thereof. Suitable starter components are, for example, the low molecular mass dihydric alcohols specified above as a synthesis component for the polyester polyols. The corresponding polymers of ε-caprolactone are particularly preferred. Lower polyester diols or polyether diols can also be used as starters for preparing the lactone polymers. Instead of the polymers of lactones it is also possible to use the corresponding, chemically equivalent polycondensates of the hydroxycarboxylic acids corresponding to the lactones.

Polyether polyols are obtainable in particular by polymerizing ethylene oxide, propylene oxide, butylene oxide, tetrahydrofuran, styrene oxide or epichlorohydrin with itself, in the presence of $BF_3$, for example, or by adducting of these compounds, if appropriate in a mixture or in succession, with starting components containing reactive hydrogen atoms, such as alcohols or amines, e.g., water, ethylene glycol, propane-1,2-diol, propane-1,3-diol, 2,2-bis(4-hydroxyphenyl) propane or aniline. Particular preference is given to polypropylene oxide, polytetrahydrofuran with a molecular weight of from 240 to 5000, and in particular from 500 to 4500.

$b_{1)}$ embraces only polyether polyols of which less than 20% by weight is composed of ethylene oxide. Polyether diols with at least 20% by weight are hydrophilic polyether diols, which are included in monomers c).

If appropriate it is also possible to use polyhydroxy olefins, preferably those having 2 terminal hydroxyl groups, e.g., α,ω-dihydroxypolybutadiene, α,ω-dihydroxypolymethacrylic esters or α,ω-dihydroxypolyacrylic esters as monomers (c1). Such compounds are known for example from EP-A 0622378. Further suitable polyols are polyacetals, polysiloxanes, and alkyd resins.

The hardness and the modulus of elasticity of the polyurethanes can be increased by using as diols (b) besides the diols (b1) low molecular weight diols (b2) having a molecular weight of from about 60 to 500, preferably from 62 to 200 g/mol.

As monomers (b2) use is made above all of the synthesis components of the short-chain alkane diols specified for the preparation of polyester polyols, preference being given to the unbranched diols having 2 to 12 carbon atoms and an even number of carbon atoms, and also pentane-1,5-diol and neopentyl glycol.

Suitable polyols $b_2)$ include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO-(CH_2)_x-OH$, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is given additionally to neopentyl glycol.

Preferably the fraction of the polyols ($b_1$), based on the total amount of the diols (b), is from 10 to 100 mol % and the fraction of the monomers ($b_2$), based on the total amount of the diols (b), is from 0 to 90 mol %. With particular preference the ratio of the diols (b1) to the monomers (b2) is from 0.1:1 to 5:1, more preferably from 0.2:1 to 2:1.

In order to improve the dispersibility of the polyurethanes in water it is possible for the polyurethanes to comprise, as a synthesis component, monomers (c), which are other than components (a), (b), and (d), and which carry at least one isocyanate group or at least one group which is reactive toward isocyanate groups and additionally at least one hydrophilic group or one group which can be converted into a hydrophilic group.

Hydrophilic monomers of this kind, although they can be used, are nevertheless not necessary for a stable miniemulsion. The amount of ionic groups is preferably less than 100 mmol per 1000 g of polyurethane, and with particular preference the polyurethane contains no monomers c).

The monomers (d), which are other than the monomers (a) to (c) and which if appropriate are also constituents of the polyurethane, serve in general for crosslinking or for chain extension.

Alcohols having a functionality of greater than 2, which may be used in order to set a certain degree of branching or crosslinking, are trimethylolpropane, glycerol or sugars, for example.

Additionally suitable are monoalcohols which in addition to the hydroxyl group carry a further isocyanate-reactive group, such as monoalcohols having one or more primary and/or secondary amino groups, monoethanolamine for example.

Polyamines having 2 or more primary and/or secondary amino groups are used above all when the chain extension and/or crosslinking is to take place in the presence of water, since amines generally react with isocyanates more quickly than do alcohols or water. This is frequently necessary when aqueous dispersions of crosslinked polyurethanes or polyurethanes with a high molar weight are desired.

Amines suitable for this purpose are generally polyfunctional amines from the molar weight range from 32 to 500 g/mol, preferably from 60 to 300 g/mol, which contain at least two amino groups, selected from the group consisting of primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be used in blocked form, e.g., in the form of the corresponding ketimines (see, e.g., CA-A 1 129 128), ketazines (cf., e.g., U.S. Pat. No. 4,269,748) or amine salts (see U.S. Pat. No. 4,292,226). Oxazolidines as well, as used for example in U.S. Pat. No. 4,192,937, are blocked polyamines which can be used for preparing the polyurethanes of the invention, for the chain extension of the prepolymers.

Monomers (e), used as well if appropriate, are monoisocyanates, monoalcohols, and monoprimary and monosecondary amines. Generally speaking their fraction is not more than 10 mol %, based on the total molar amount of the monomers. These monofunctional compounds normally carry further functional groups such as olefinic groups or carbonyl groups and serve to introduce functional groups into the polyurethane that allow the polyurethane to be dispersed and/or crosslinked or subjected to further polymer-analogous reaction. Monomers suitable for this purpose include those such as isopropenyl-α,α-dimethylbenzyl isocyanate (TMI) and esters of acrylic or methacrylic acid such as hydroxyethyl acrylate or hydroxyethyl methacrylate.

Coatings having a particularly good profile of properties are obtained above all when essentially only aliphatic diisocyanates, cycloaliphatic diisocyanates or araliphatic diisocyanates are used as monomers (a).

Normally the components (a) to (e) and their respective molar amounts are chosen so that the ratio A:B, where A is the molar amount of isocyanate groups and B is the sum of the molar amount of the hydroxyl groups and the molar amount of the functional groups which are able to react with isocyanates in an addition reaction, is from 0.5:1 to 2:1, preferably from 0.8:1 to 1.5, more preferably from 0.9:1 to 1.2:1. With very particular preference the ratio A:B is as close as possible to 1:1.

The monomers (a) to (e) employed carry on average normally from 1.5 to 3, preferably from 1.9 to 2.1, more preferably 2.0 isocyanate groups and, respectively, functional groups which are able to react with isocyanates in an addition reaction.

In accordance with the invention one of the starting compounds of polymer I is an initiator of free-radical addition polymerization. This initiator is therefore attached to polymer I as a result of the reaction of the starting compounds.

The initiator accordingly contains at least one, preferably one or two, more preferably two, reactive groups which enable it to attach to polymer I. In the case of a polyurethane as polymer I the reactive groups in question may be isocyanate groups or isocyanate-reactive groups, e.g. hydroxyl groups, amino groups or carboxylate groups. The groups in question are preferably isocyanate groups or hydroxyl groups.

The initiator includes at least one group which is able to initiate free-radical addition polymerizations, such as an azo or peroxo group.

Preferably the initiator contains an initiating group, in particular an azo group. Suitable initiators are known for example from EP-A-522675 and DE-A-4123223.

Suitable initiators have a molecular weight of between 58 and 5000 g/mol.

In particular the molecular weight is from 100 to 1000 g/mol.

Particular suitability is possessed by the following initiators of the formula I to VI

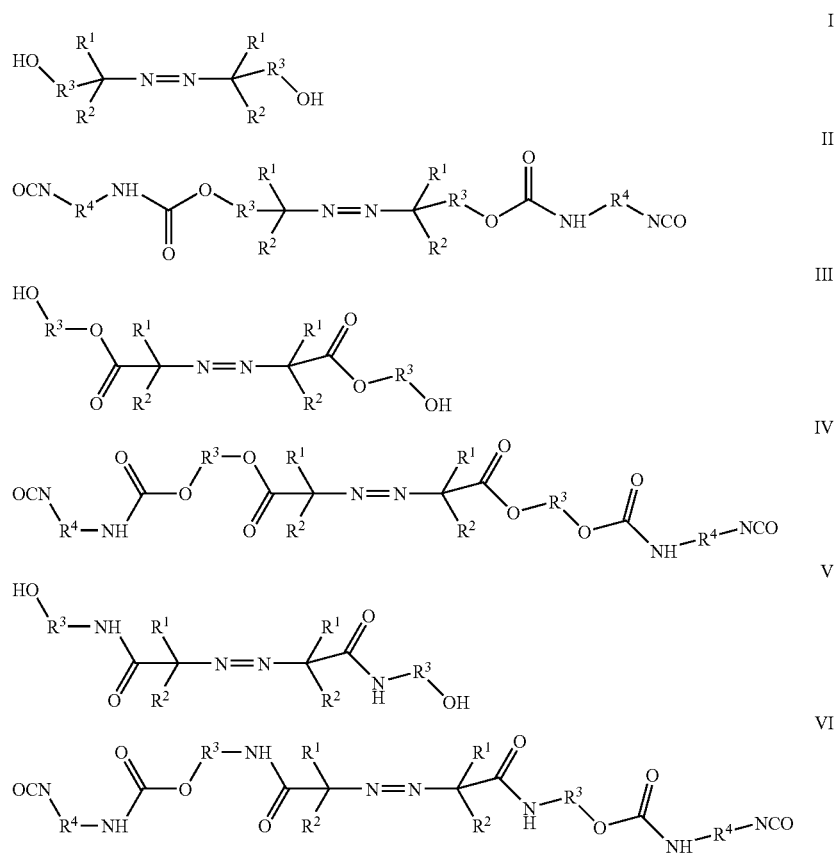

In these formulae the variables have the following definition:

$R^1$: H atom or $C_1$-$C_4$ alkyl group, preferably H atom or methyl group $R^2$: CN group or $C_1$-$C_4$ alkyl group $R^3$, $R^4$: independently of one another, divalent organic group having up to 30 carbon atoms, preferably having 2 to 20 carbon atoms. In formula I and II $R^3$ may also be a single bond; in other words, $R^3$ is omitted there.

The initiator can be a polyisocyanate (a), a polyol (b) or other monomers (c) to (e), depending on the nature of the reactive group and on their number.

The fraction of the initiators in polymer I is guided ultimately by the desired amount of polymer II in the block copolymer, since the initiator is intended to initiate the preparation of the polymer II.

The amount of the initiator in polymer I is preferably from 0.1 to 100 parts by weight, more preferably from 0.1 to 5 parts by weight, very preferably from 0.3 to 3 parts by weight per 100 parts by weight of polymer II.

Polymer II is obtainable by free-radical addition polymerization of ethylenically unsaturated compounds (monomers).

The polymer is composed of at least 60% by weight, preferably at least 80% by weight, more preferably at least 90% by weight of what are called principal monomers.

The principal monomers are selected from $C_1$-$C_{20}$ alkyl (meth)acrylates, vinyl esters of carboxylic acids containing up to 20 carbon atoms, vinyl aromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and one or two double bonds or mixtures of these monomers.

Mention may be made for example of (meth)acrylic acid alkyl esters having a $C_1$-$C_{10}$ alkyl radical, such as methyl methacrylate, methyl acrylate, n-butyl acrylate, ethyl acrylate and 2-ethylhexyl acrylate.

In particular suitability is also possessed by mixtures of the (meth)acrylic acid alkyl esters.

Vinyl esters of carboxylic acids having 1 to 20 carbon atoms are, for example, vinyl laurate, vinyl stearate, vinyl propionate, Versatic acid vinyl esters, and vinyl acetate.

Suitable vinyl aromatic compounds include vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Examples of vinyl ethers that may be mentioned include vinyl methyl ether and vinyl isobutyl ether. Preference is given to vinyl ethers of alcohols containing 1 to 4 carbon atoms.

Hydrocarbons that may be mentioned that have 4 to 8 carbon atoms and two olefinic double bonds include butadiene, isoprene, and chloroprene.

Preferred principal monomers are the $C_1$ to $C_{10}$ alkyl acrylates and methacrylates, particularly $C_1$ to $C_8$ alkyl acrylates and methacrylates and vinyl aromatics, especially styrene, and mixtures thereof.

Very particular preference is given to methyl acrylate, methyl methacrylate, ethyl acrylate, n-butyl acrylate, n-hexyl acrylate, octyl acrylate and 2-ethyl hexyl acrylate, styrene, and mixtures of these monomers.

Besides the principal monomers the polymer may contain further monomers, e.g., monomers containing carboxylic acid, sulfonic acid or phosphonic acid groups. Carboxylic acid groups are preferred. Examples that may be mentioned include acrylic acid, methacrylic acid, itaconic acid, maleic acid, and fumaric acid.

Further monomers are, for example, monomers also containing hydroxyl groups, especially $C_1$-$C_{10}$ hydroxy alkyl (meth)acrylates and also (meth)acrylamide.

Further monomers that may be mentioned, moreover, include phenyloxyethyl glycol mono(meth)acrylate, glycidyl acrylate, glycidyl methacrylate, and amino (meth)acrylates such as 2-aminoethyl(meth)acrylate.

Crosslinking monomers may also be mentioned as further monomers.

In particular the polymer is synthesized from at least 60% by weight, more preferably at least 80% by weight, and very preferably at least 95% by weight of $C_1$ to $C_{20}$ alkyl (meth) acrylates.

The fraction of polymer I as a proportion of the block copolymer is preferably from 5 to 95% by weight, more preferably from 20 to 80% by weight. The fraction of the polymer II, accordingly, is from 5 to 95% by weight, more preferably from 20 to 80% by weight, based on the block copolymer (corresponding to the sum of the weights of polymer I and II).

With very particular preference the fraction of polymer I and II is in each case from 40 to 60% by weight.

The dispersion of the block copolymer is preferably prepared by polymerization in miniemulsion. This process has already been described at the outset.

A possible procedure is first to react the starting compounds of polymer I to form polymer I and then to react the starting compounds of the polymer II in the presence of polymer I.

The polyaddition of components (a) to (e) for preparing the polyurethane takes place preferably at reaction temperatures of up to 180° C. under atmospheric pressure or under superatmospheric pressure, preferably up to 100° C. under atmospheric pressure.

The free-radical addition polymerization of the starting compounds to form polymer II takes place likewise preferably at temperatures up to 130° C. at atmospheric pressure or under superatmospheric pressure, in particular at temperatures up to 100° C. under atmospheric pressure.

In one preferred embodiment a miniemulsion is formed from all of the starting compounds of the polymers I and II and the reaction of all of the starting compounds to form the block copolymer is carried out in one process step.

The block copolymer obtained has a high molar weight and a uniform block structure. Advantageous performance properties are, in particular, high transparency and good mechanical properties in the films obtained.

In particular it is possible to form films from the dispersions even at low temperatures, e.g., at temperatures less than 50° C., in particular at room temperature (21° C.) under atmospheric pressure.

The dispersions have good performance properties, including in particular a good adhesion to customary substances made of metal, plastic or wood.

The dispersions are highly suitable as binders for adhesives, sealants, coating compositions, leather dressing or paper coatings.

The dispersions are also highly suitable as binders for cosmetic formulations, e.g., hairspray, styling gel, nail varnish, makeup or shampoo.

They can in particular also be used as dispersants for organic or inorganic solids or as phase compatibilizers, in particular in polymer blends.

EXAMPLE 1

6.1 g of pTHF 1000 were mixed with 0.4 g of azo initiator VA085 from WAKO (2,2'-azobis(N-butanol-2-yl)-2-methyl-propionamide), 4 g of styrene, 0.2 g of hexadecane and 1.63 g of IPDI and this mixture was rapidly stirred together with a solution of 2.17 g of Steinapol NLS in 27.9 g of DI water. This was followed by sonification for 2 minutes using a Branson sonifier W 450 at 100% amplitude and 50% pulse, while cooling with an ice bath. Thereafter 2 drops of DBTL were added and the mixture was heated at 60° C. for 5 h. The temperature was then raised to 72° C. for 5 h, and subsequently to 95° C. for a further 5 h. There was no longer any discernible styrene odor. After filtration over 40 my the solids content found was 29.2%. Particle size: 150 nm.

EXAMPLE 2

6.2 g of pTHF 1000 were mixed with 0.358 g of azo initiator VA086 from WAKO (2,2'-azobis(2-methyl-N-(2-hydroxyethyl))propionamide), 4.1 g of styrene, 0.2 g of hexadecane and 1.65 g of IPDI and this mixture was rapidly stirred together with a solution of 2.19 g of Steinapol NLS in 28.1 g of DI water. This was followed by sonification for 2 minutes using a Branson sonifier W 450 at 100% amplitude and 50% pulse, while cooling with an ice bath. Thereafter 2 drops of DBTL were added and the mixture was heated at 60° C. for 5 h. The temperature was then raised to 72° C. for 5 h, and subsequently to 95° C. for a further 5 h. There was no longer any discernible styrene odor. After filtration over 40 my the solids content found was 27.6%. Particle size: 148 nm

The invention claimed is:

1. A process for preparing an aqueous dispersion of a block copolymer comprising a polyadduct or polycondensate (polymer I) and a polymer obtained by free-radical addition polymerization (polymer II) comprising
reacting, in miniemulsion, starting compounds to form the polymer I,
wherein one of the starting compounds of polymer I is an initiator of free-radical addition polymerization, and
free radically addition polymerizing monomers to form the polymer II in the presence of said initiator, and
wherein the miniemulsion has been prepared in the presence of a hydrophobic costabilizer and the particle size of the emulsified droplets of the starting compounds is from 50 to 500 nm.

2. The process according to claim 1, wherein the initiator comprises at least one azo compound comprising at least one isocyanate group or at least one isocyanate-reactive group.

3. The process according to claim 1, wherein the amount of the initiator as starting compound for polymer I is from 0.1 to 10 parts by weight per 100 parts by weight of polymer II.

4. The process according to claim 1, wherein the amount of polymer I is from 5 to 95% by weight, based on the block copolymer.

5. The process according to claim 1, wherein polymer I is a polyurethane, and the polyurethane as part of the block copolymer has been synthesized from
a) polyisocyanates,
b) polyols of which b₁) 10 to 100 mol %, based on the total amount of the polyols (b), have a number average molecular weight of from 500 to 5000 g/mol, b₂) 0 to 90 mol %, based on the total amount of the polyols (b), have a molecular weight of from 60 to 500 g/mol, c) monomers other than the monomers (a) and (b), comprising at least one isocyanate group or at least one group which is reactive toward isocyanate groups, and further comprising at least one hydrophilic group, d) optionally, further compounds, other than the monomers (a) to (c), comprising at least 2 isocyanate-reactive groups, of which at least one group is a primary or secondary amino group or a mercapto group, e) optionally, monovalent compounds, other than the monomers (a) to (d), comprising a reactive group which is an alcoholic hydroxyl group, a primary or secondary amino group or an isocyanate group.

6. The process according to claim 1, wherein the polymer II has been synthesized from at least 40% by weight of principal monomers selected from the group consisting of C1 to C20 alkyl(meth)acrylates, vinyl esters of carboxylic acids comprising up to 20 carbon atoms, vinyl aromatics comprising up to 20 carbon atoms, ethylenically unsaturated nitriles, vinyl halides, vinyl ethers of alcohols comprising 1 to 10 carbon atoms, aliphatic hydrocarbons comprising 2 to 8 carbon atoms and one or two double bonds, and mixtures of these monomers.

7. The process according to claim 1, wherein the miniemulsion is formed from the starting compounds of the polymer I and the monomers of the polymer II and the reaction of the starting compounds and free radical polymerization of monomers to form the block copolymer takes place in the miniemulsion.

8. A method of making a coating composition, an adhesive, an impregnating composition, or a sealant comprising forming the coating composition, the adhesive, the impregnating composition, or the sealant with an aqueous dispersion of a block copolymer comprising a polyadduct or polycondensate (polymer I) and a polymer obtained by free-radical addition polymerization (polymer II), wherein the polymer I is obtained by reaction of starting compounds in miniemulsion, wherein at least one of the starting compounds of polymer I is an initiator of free-radical addition polymerization, wherein the polymer II is prepared in the presence of said initiator, and wherein the miniemulsion has been prepared in the presence of a hydrophobic costabilizer and the particle size of the emulsified droplets of the starting compounds is from 50 to 500 nm.

9. The process according to claim 1, wherein the aqueous dispersion of a block copolymer comprise a polyadduct.

10. The process according to claim 1, wherein the aqueous dispersion of a block copolymer comprises a polycondensate.

11. The process according to claim 2, wherein the at least one azo compound comprises at least one isocyanate group.

12. The process of claim 2, wherein the at least one azo compound comprises at least one isocyanate-reactive group.

13. The process of claim 5, wherein the aqueous dispersion comprises the further compounds d).

14. The process of claim 5, wherein the aqueous dispersion comprises the monovalent compounds e).

15. The process of claim 5, wherein the aqueous dispersion comprises the further compounds d) and the monovalent compounds e).

16. A method of making a coating composition, an adhesive, an impregnating composition, or a sealant comprising forming the coating composition, the adhesive, the impregnating composition, or the sealant with an aqueous dispersion of a block copolymer comprising a polyurethane and a polymer obtained by free-radical addition polymerization (polymer II), wherein the polyurethane is obtained by reaction of, as starting compounds, an isocyanate and an isocyanate reactive compound in miniemulsion, wherein at least one of the starting compounds is an initiator of free-radical addition polymerization, wherein the polymer II is prepared in the presence of said initiator, and wherein the miniemulsion has been prepared in the presence of a hydrophobic costabilizer and the particle size of the emulsified droplets of the starting compounds is from 50 to 500 nm.

* * * * *